*INVENTOR.*
HOWARD W. NAULTY
BY MALCOLM N. BROWN

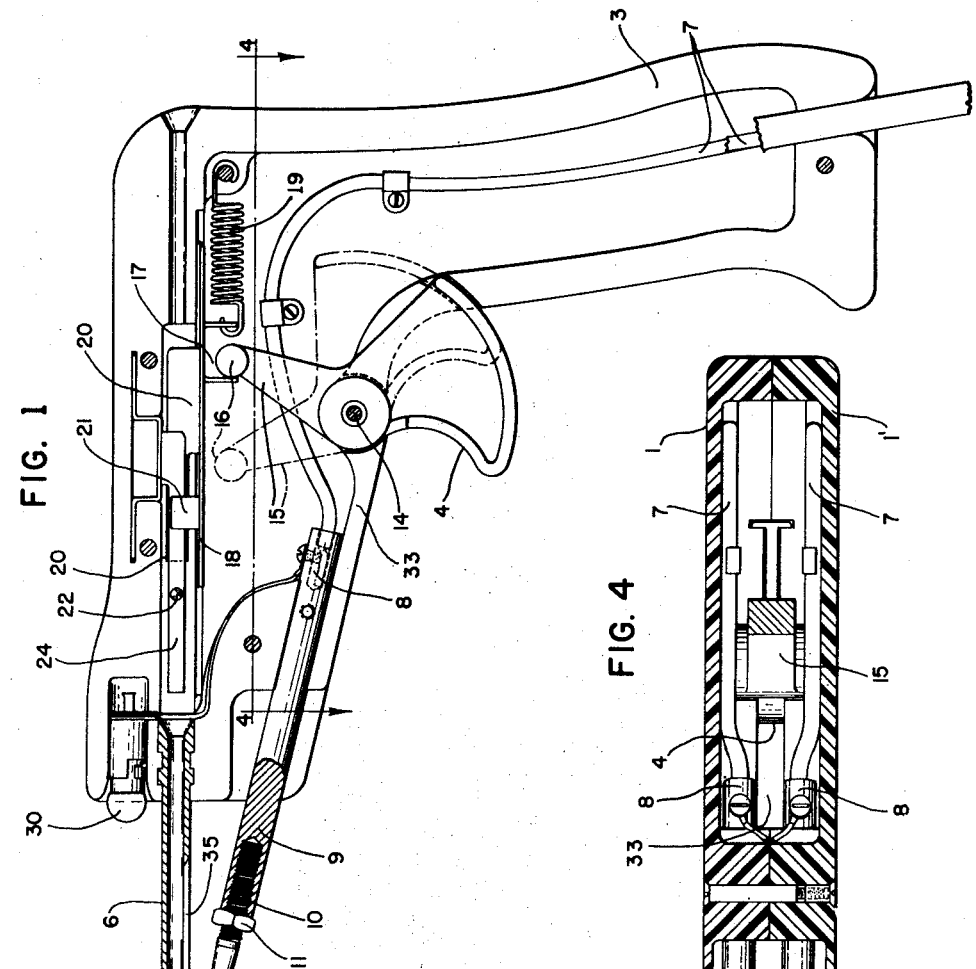
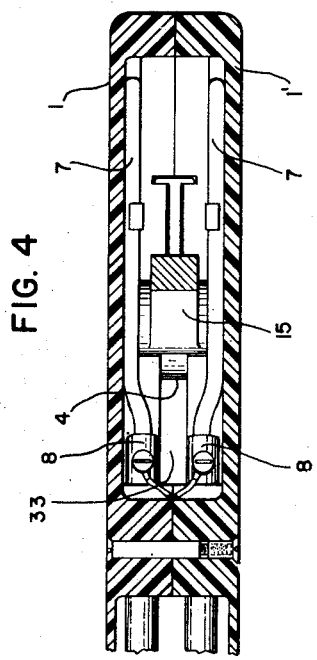
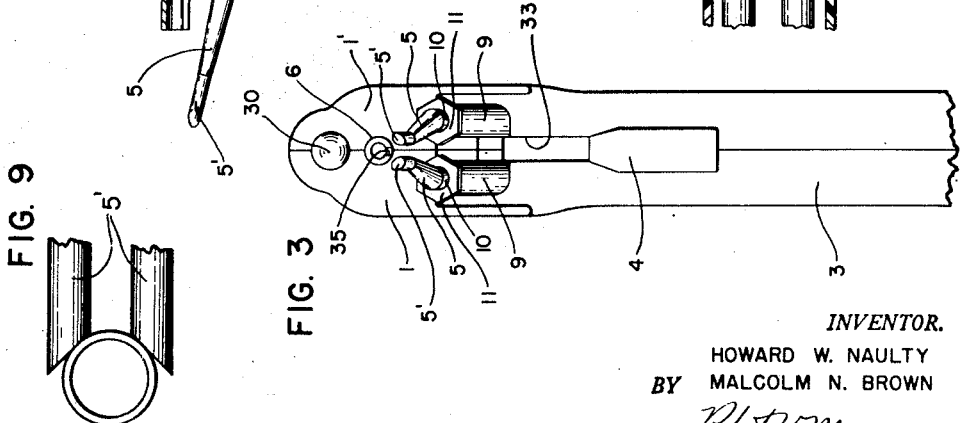

Patented July 22, 1952

2,604,571

UNITED STATES PATENT OFFICE 2,604,571

SOLDERING GUN

Howard W. Naulty, East Aurora, and Malcolm N. Brown, Kenmore, N. Y., assignors, by mesne assignments, to Cornell Aeronautical Laboratory, Inc., Buffalo, N. Y., a corporation of New York Application October 31, 1946, Serial No. 706,932

2 Claims. (Cl. 219—27)

This invention relates to soldering, and in particular to so-called soldering guns of the electrical resistance type, in which the solder is mechanically fed to the heated points as required. The present invention seeks to improve these soldering guns by providing better control of the solder feed, by clearing the work area of solder so that the operator can see to work in confined places, and by providing a light to both illuminate the work and indicate by dimming when contact is made. Other objects are to prevent clogging of the feed mechanism and to permit easy replacement of the electrode tips. Various other objects will become apparent as the description proceeds. In general the invention is concerned with providing a more convenient and reliable device adapted to quantity manufacture so that soldering guns may go into more general use.

Referring now to drawings forming part of this specification,

Fig. 1 is a side view of the soldering gun with one cover plate removed to show the interior mechanism.

Fig. 3 is a view of the soldering gun from the front.

Fig. 4 is a plan view in cross-section on line 4—4 of Fig. 1.

Fig. 9 shows the fish-tail tips on a larger scale to illustrate the resulting line or point contact with the work.

Similar reference numerals refer to similar parts throughout the various views.

Figure 2:
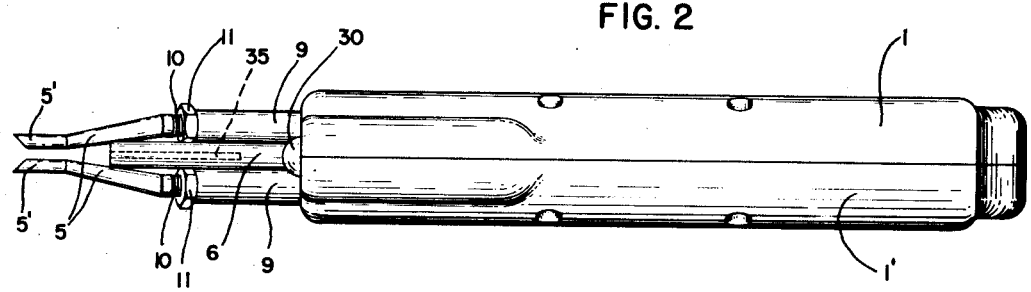
Fig. 2 is a plan view of the soldering gun.

Referring now to Fig. 1 and Fig. 2, the device has the appearance of a pistol, and the body portion is preferably moulded of two plastic sections 1 and 1' of proper contour to enclose the operating parts. The dividing line runs through the middle of the body as shown in Fig. 2 and Fig. 3. In Fig. 1 the cover section 1' is removed so as to expose the principal operating parts. These include the pistol grip 3, the trigger 4, the heating electrodes 5, and the solder guide tube 6, through which the solder S (see Figs. 5 to Fig. 7) may be fed to the work. Electricity is led to and from the heating electrodes 5 by the conductors 7 entering through the butt of the pistol grip 3 and extending to the sockets 8 which are of relatively heavy conducting metal having sockets 9 at the other ends to receive the stems 10 of the electrodes 5. These stems 10 are threaded and provided with a screw and nut connection 11 which can be tightened to insure a good electrical connection. By the use of such sockets electrodes can be made interchangeable. The leads 7 and sockets 9 may be of copper or any other good conducting material. The electrodes 5 should be of a special material of high electrical resistance and relatively lower heat conductivity. We have found that stainless steel or "Radiohm Nichrome" are especially effective and used a minimum of contact area, provided the voltage is restricted to between one and four volts. Points so made performed satisfactorily on soldering wire up to and including size 10, using about 40 amperes. A small amount of arcing was found, but it did not seem detrimental to the tips, the life of which was comparable to that of any ordinary soldering iron.

The tips 5' of the electrodes 5 are brought closer together than the sockets 9 and stems 10 so as to leave a small gap at the soldering point. The tips 5' can be brought close together by converging the sockets or preferably by using parallel sockets 9 and making the electrodes 5 in a dog-leg form as shown. The gap between the electrode tips 5' can be set by turning the electrodes 5 in their sockets 9. The tips 5' are narrow and bevelled in a fish-tail or V form, so that only a line or point contact can be made with the work. This gives a very concentrated current flow and correspondingly high heat with minimum current. It prolongs the life of the electrodes, is cooler for the operator, and because of the more concentrated heat at the work helps to prevent the possibility of cold solder joints. The narrow nose permits getting into small places. The heat in contact with the work is independent of whether solder is fed or not, so that the device can be used to unsolder as well as to make new joints. No switch is necessary on the tool, as the electrode tips make their own contact, and no current flows except when the tips 5' are in contact with the work.

The solder S is fed through the guide tube 6 to a point on the work just above the electrode tips 5' by operating trigger 4. This trigger 4, pivoted at 14, carries an integral arm 15 having at its tip a pin 16 which swings forward when the trigger 4 is pulled. The pin 16 operates in a notch 17 which is part of the base of a movable plate or slide 18 retracted by the spring 19, so that the pin 16 is always against the forward side of the notch 17.

Figure 5:
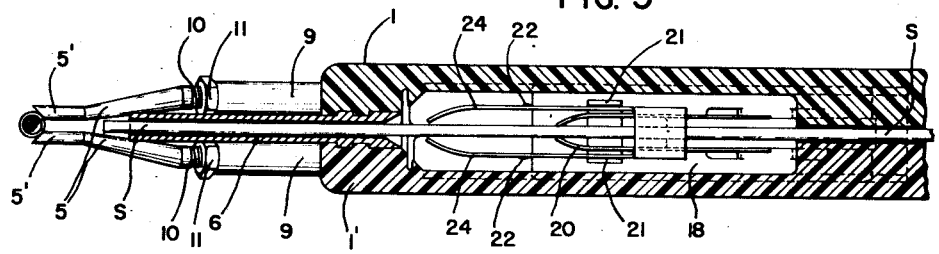
Fig. 5 is a longitudinal cross-sectional view showing the solder feed, slide, cam plates and grips when the trigger is released.
Figure 6:
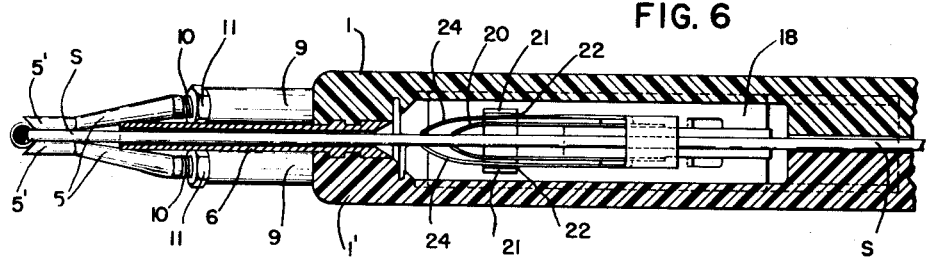
Fig. 6 shows the same parts when the trigger is fully depressed.
Figure 7:
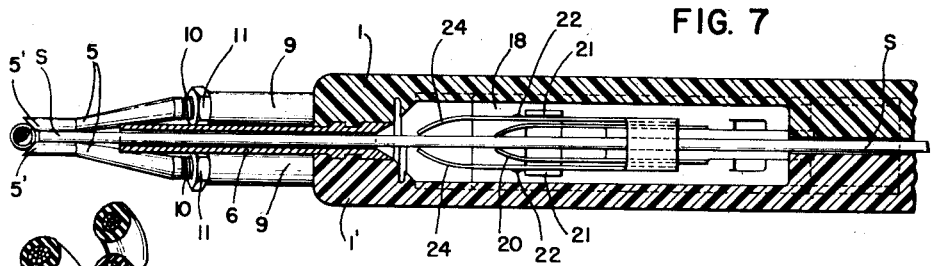
Fig. 7 shows the same parts when the trigger is partly released on the return stroke.
Figure 8:
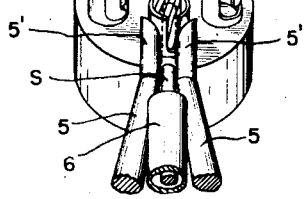
Fig. 8 shows the tip of the tool being applied to some soldering work.

This movable plate 18 is shown in plan view in Fig. 5, and in various operating positions in Fig. 6 and Fig. 7. As it moves back and forth under the action of the trigger it brings about the operation of the various gripping elements which propel and retract the solder as desired. A pair of spring jaws 20 attached to the movable plate 18 grip the solder wire S between their tips and carry it forward with them when the plate 18 is moved forward by the trigger pull. The movable plate 18 also has attached thereto a pair of upwardly projecting cam lugs 21 which move along with the plate 18 and near the end of the stroke engage the buttons 22 on a second pair of spring jaws 24 which are permanently fixed to the upper part of the casing. When these jaws 24 grip the solder wire S it is held from retracting.

The operation can now be seen by studying Fig. 5, Fig. 6 and Fig. 7. Fig. 5 shows the feed control elements in the initial position before the trigger is pulled. At that time the movable plate 18 is in the rearward position retracted by the spring 19, the inner movable spring jaws 20 (attached to the plate 18) are gripping the solder S, and the outer fixed spring jaws 24 are not gripping the wire. When the trigger 4 is pulled the movable plate 18 advances toward the electrode tips 5' and the spring grips 20 biting into the soft solder wire S carry it forward.

As shown in Fig. 6, toward the end of the stroke the cams 21 on the moving plate 18 slide over the buttons 22 and squeeze together the tips of the fixed spring jaws 24, which, due to their inclination still permit the solder to move forward but will bite into it and prevent retraction of the solder so long as the outer spring jaws 24 are thus pinched. In the fully extended position, with the trigger pulled to the end of its stroke, the solder is in the operating position just above the electrode tips 5' and can be placed against the work, where it is melted by the resulting current flow thru the tips 5' heating the work. Since the work itself creates the heat, not an arc, failures due to cold soldered joints are positively eliminated.

In order that the operator may observe the work and not apply too much solder, it is highly desirable that he may be able to retract the solder wire S at will. This is accomplished by releasing the trigger 4 which retracts the movable plate 18. For a short distance, about one-quarter of an inch, the buttons 22 remain gripped by the cams 21 so that the solder is not pulled backward on the solder without biting it sufficiently to overcome the restraint of the locked jaws 24. However, as soon as the rearward travel of the cams 21 releases the buttons 22 and jaws 24, as shown in Fig. 7, the inner or moving jaws 20 are able to pull the solder back with them for the remainder of the stroke. This retracts the solder from the electrodes and the work and gives the operator the desired control and a chance to see the results.

It will be noted that in the above series of operations, particularly in the partially retracted step, the inner or movable spring grips 20 has moved back on the solder wire S about one-quarter of an inch to take up a new position relative to the solder. Hence when the trigger 4 is again pulled for a full stroke, the solder will be advanced a quarter of an inch farther than formerly, this being about the amount of solder usually consumed in each soldering operation. If more is needed the trigger can be pulled more than once. If less is desired, the trigger need not be fully pulled. The amount is thus entirely under the control of the operator. Of course a quarter of an inch merely illustrates a convenient setting generally used in practice, but the cams 21 may be designed to give any other increment, their length determining the amount of feed per stroke, since the movable jaws step back each time an amount equal to the cam length.

In general the trigger feed advances and retracts the solder with small strokes of the trigger, but feeds forward when the trigger is pulled all the way. The solder can also be fed forward in small increments continuously by repeated short pulls of the trigger near the end of the trigger travel. In that case the solder will move out steadily without retracting at all.

The solder is only in contact with the work intermittently, the electricity is only on during the instant of use when heating the work, and the electrodes are relatively poor conductors of heat as metals go, so that the device can be used continuously without overheating. The natural circulation of air around the projecting electrodes and solder guide tube dissipates most of the heat.

The small space occupied by the electrode tips and the automatic feeding of the solder permit the tool to operate in very close quarters, such as among a great number of closely spaced wiring terminals. In order to handle such close work rapidly it is necessary that the operator should not only see the work clearly but should also have an indication of the amount and degree of electrical contact across the electrode tips. For this purpose a small electric light bulb 30 is mounted on the end of the barrel as shown in Fig. 1, and is connected in shunt across the electrode circuit, so that it is bright as long as the electrodes do not contact the solder or work, then dims when contact is established, serving as a voltage indicator, and has the further advantage that if the tool is laid down in the shop with the power left on, the continuously lighted bulb will call attention to the matter.

The action of the inner or movable grip springs 20 when dragging back to a new position on the solder wire S tends to strip minute shavings from the solder wire, which after a long period of use tend to accumulate in the casing and might cause trouble. Accordingly, a slot 33 is provided in the case 1, 1' through which such particles may fall or be blown out.

In order that flux from the melted solder may not clog the guide tube 6, slots 35 are provided in the under side of the tube 6 as shown in broken lines in Fig. 2.

The soldering gun described above not only permits a rate of production about triple that of an ordinary soldering iron, but also considerably improves the quality of work from the standpoint of requiring less solder and making a more secure connection. Since the work is always heated, it largely eliminates the possibility of cold soldered joints, which have been a source of trouble, particularly in the electrical wiring. Tests with the device have demonstrated that joints which appeared to the eye to have insufficient solder were in reality so secure that when placed under tension the wire would break before the soldered joint would yield.

While we have in the foregoing described a certain specific form by way of example, it will be understood that it is merely for the purpose of illustration to make clear the principles of the invention, which is not limited to the particular form shown, but is susceptible to various modifications and adaptations in different installations as will be apparent to those skilled in the art without departing from the scope of the invention as stated in the following claims.

We claim:

1. In a soldering gun, the combination of a body adapted to be held in one hand, a pair of closely spaced electrodes carried by said body and insulated from each other, said electrodes being metallic and of sufficient cross-section to remain relatively cool as compared to the work and adapted to be placed in contact with the work to complete a heating circuit spot primarily within the work itself, a solder guide and solder wire mounted on said body and directed between said electrodes but spaced therefrom so as to apply the solder directly on the heating spot of work, a trigger having two ranges of motion, the initial range to advance the solder wire and retract it for inspection of the result and the final range to only advance the solder, a movable grip engaging said wire and operated by said trigger to both advance and retract the wire with small strokes of the trigger during the initial portion of the trigger travel, and a supplementary grip engaged during the final portion of the trigger travel to hold the wire against retraction, the second mentioned grip when so engaged predominating over the first mentioned grip so that the latter may then feed the wire only forward, whereby the operator may control soldering and inspect the result before definitely feeding more solder forward.

2. In a feed mechanism for moving a soldering wire, the combination of a trigger, a movable reciprocating grip connected to said trigger, said reciprocating grip engaging said wire and being operated by said trigger to both advance and retract the wire with small strokes of the trigger during the initial portion of the trigger travel, a supplementary grip fixed against retraction, and a reciprocating clamp lock also connected to said trigger, said clamp lock being detached from said supplementary grip during the initial portion of the trigger travel so that said supplementary grip is then open and inactive, said clamp lock engaging and closing said supplementary grip during the final portion of the trigger travel to hold the wire against retraction, the supplementary grip when so closed on the wire predominating over the first mentioned grip so that said first mentioned grip may then feed the wire only forward, whereby the initial portion of the trigger travel may cause the wire to be advanced and retracted for inspection of the soldering result and the final portion of the trigger travel will bring forward only a new supply of solder.

HOWARD W. NAULTY.
MALCOLM N. BROWN.

REFERENCES CITED

The following references are of record in the file of this patent:

UNITED STATES PATENTS

| Number | Name | Date |
|---|---|---|
| 449,258 | Robinson | Mar. 31, 1891 |
| 1,851,420 | Carson | Mar. 29, 1932 |
| 2,162,615 | Harlan | June 13, 1939 |
| 2,210,352 | Albietz | Aug. 6, 1940 |
| 2,221,646 | McPherson | Nov. 12, 1940 |
| 2,228,291 | Weston | Jan. 14, 1941 |
| 2,251,557 | Weston | Aug. 5, 1941 |
| 2,260,030 | Hurst | Oct. 21, 1941 |
| 2,295,195 | Barnum | Sept. 8, 1942 |
| 2,396,799 | McCully | Mar. 19, 1946 |
| 2,433,514 | Hughey | Dec. 30, 1947 |
| 2,454,875 | Hyde | Nov. 30, 1948 |

FOREIGN PATENTS

| Number | Country | Date |
|---|---|---|
| 494,419 | Great Britain | Oct. 21, 1938 |
| 556,835 | Great Britain | Oct. 25, 1943 |